United States Patent
Yasukawa

(10) Patent No.: US 11,526,597 B2
(45) Date of Patent: Dec. 13, 2022

(54) INFORMATION PROCESSING APPARATUS, METHOD OF CONTROLLING THE SAME, AND STORAGE MEDIUM

(71) Applicant: CANON KABUSHIKI KAISHA, Tokyo (JP)

(72) Inventor: Akari Yasukawa, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 224 days.

(21) Appl. No.: 16/537,909

(22) Filed: Aug. 12, 2019

(65) Prior Publication Data
US 2020/0074075 A1 Mar. 5, 2020

(30) Foreign Application Priority Data
Aug. 28, 2018 (JP) .............................. JP2018-159476

(51) Int. Cl.
| G06F 21/00 | (2013.01) |
| G06F 21/51 | (2013.01) |
| G06F 21/55 | (2013.01) |
| G06F 11/14 | (2006.01) |

(52) U.S. Cl.
CPC .......... *G06F 21/51* (2013.01); *G06F 11/1469* (2013.01); *G06F 21/554* (2013.01); *G06F 2201/82* (2013.01); *G06F 2221/033* (2013.01)

(58) Field of Classification Search
CPC .. G06F 21/51; G06F 21/554; G06F 2221/033; G06F 11/1469; G06F 2201/82
See application file for complete search history.

(56) References Cited

U.S. PATENT DOCUMENTS

| 8,181,032 B2* | 5/2012 | Prakash | G06F 21/575 726/19 |
| 2002/0059480 A1* | 5/2002 | Matsuura | G06F 8/61 710/1 |
| 2004/0187008 A1* | 9/2004 | Harada | G06F 21/57 713/176 |
| 2012/0044534 A1* | 2/2012 | Ichikawa | G06F 9/4411 358/1.15 |
| 2013/0290963 A1* | 10/2013 | Simske | G06Q 10/06 718/100 |
| 2014/0122902 A1* | 5/2014 | Isozaki | G06F 12/1433 713/193 |
| 2017/0249483 A1 | 8/2017 | Kawazu | |

FOREIGN PATENT DOCUMENTS

| JP | 2008171041 A | 7/2008 |
| JP | 2017153044 A | 8/2017 |

* cited by examiner

*Primary Examiner* — Ghazal B Shehni
(74) *Attorney, Agent, or Firm* — Venable LLP

(57) ABSTRACT

An information processing apparatus is provided. The apparatus comprises a verification unit configured to verify an application program; and a control unit configured to, in a case where the verification by the verification unit fails, determine whether or not to restore the application program based on a type of the application program, restore the application program in a case where the control unit determined that the application program is to be restored, not permit execution of the application program in a case where the control unit determined that the application program is not to be restored, and permit execution of an application program successfully verified by the verification unit or the restored application program.

10 Claims, 11 Drawing Sheets

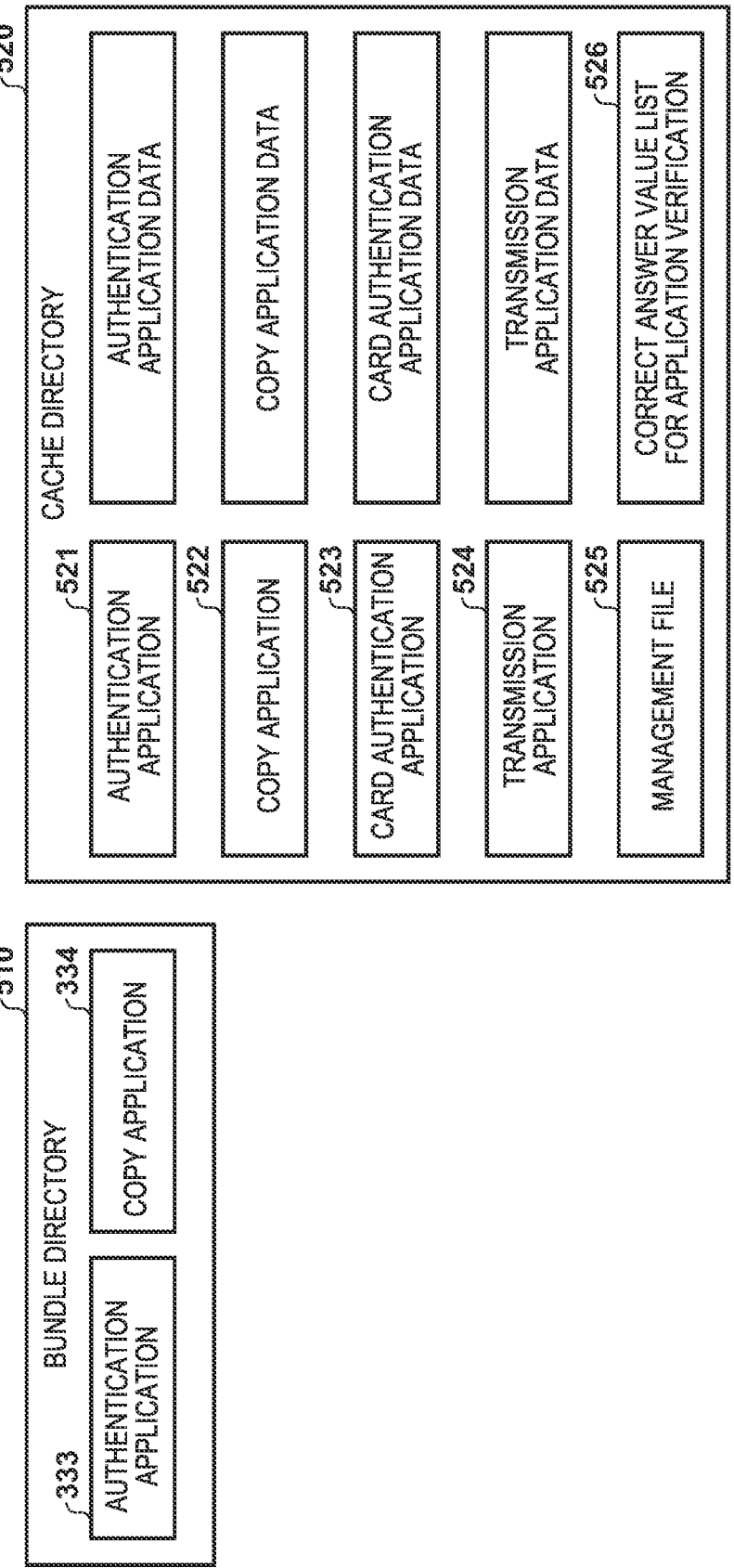

FIG. 6A

| 6001 | 6002 | 6003 | 6004 | 6005 |
|---|---|---|---|---|
| login_app | /bin/bundles/login_app.jar | bundle, login | Start | 1 |
| copy_app | /bin/bundles/copy_app.jar | bundle, copy | Start | 2 |
| card_app | - | -, login | Stop | 1 |
| send_app | - | -, send | Start | 3 |

FIG. 6B

| 6101 | 6102 |
|---|---|
| login_app | 99f7c540abd20f794d7374fb |
| copy_app | 5784bdc430a7dbe320f24d53 |
| card_app | 35782bfdea93bb5fea39fbe2 |
| send_app | bd6e9f8306743baef218444c |

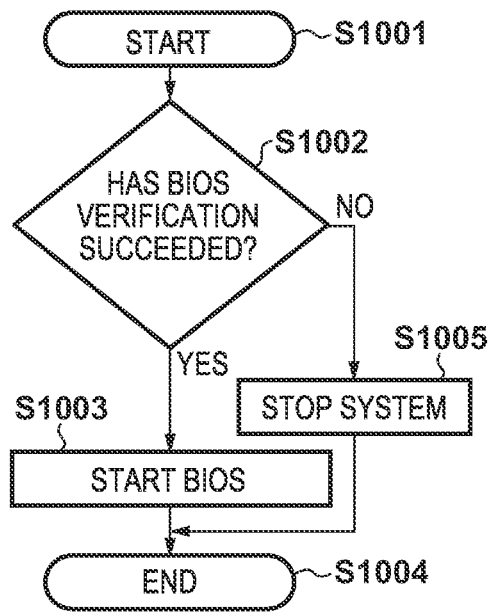
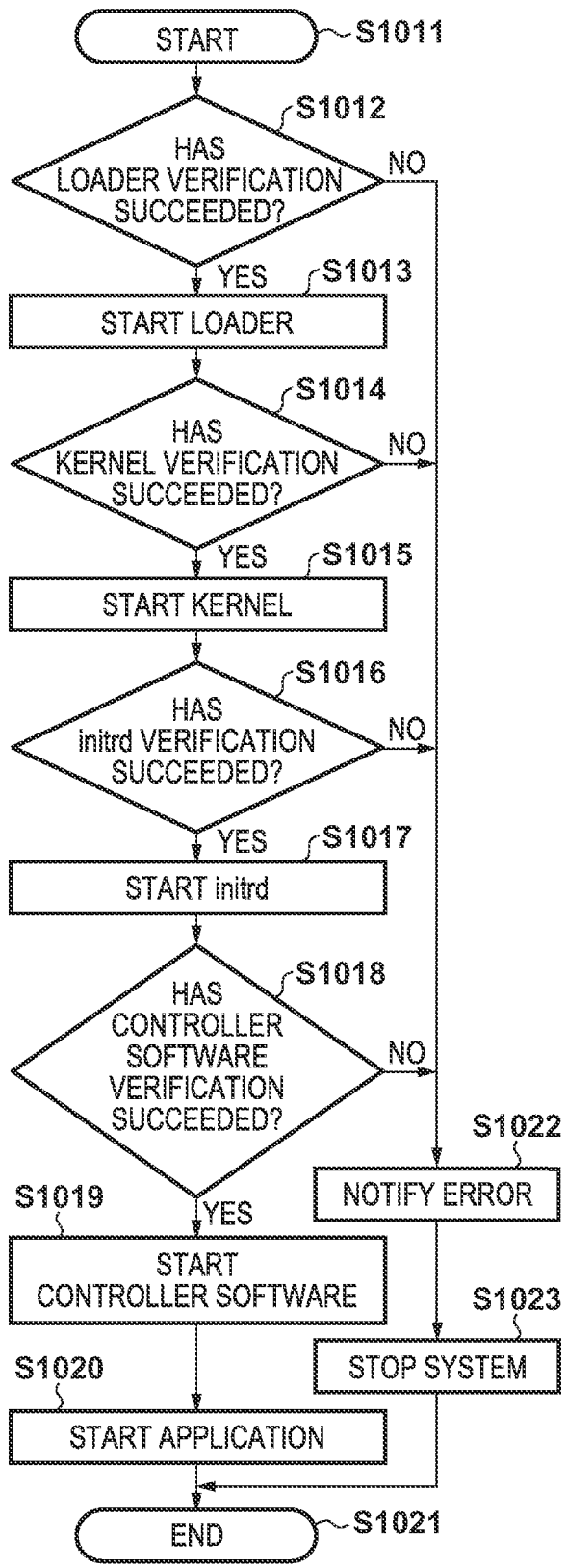

ered trademark) ROM 211 is connected to the SATA I/F.
INFORMATION PROCESSING APPARATUS, METHOD OF CONTROLLING THE SAME, AND STORAGE MEDIUM

BACKGROUND OF THE INVENTION

Field of the Invention

The present invention relates to an information processing apparatus having, for example, a software tampering detection function, a control method thereof, and a storage medium.

Description of the Related Art

An attack in which a third party tampers with software for controlling a device to perform illicit use has become a problem. In the case of illicit use, there is a risk that the owner of the device may be greatly harmed by the theft of information assets and a risk of use as a foothold for an attack on another system. In response to such an attack, a means has been devised to verify that the software is not tampered with at the time of use of the device (Japanese Patent Laid-Open No. 2017-153044).

Furthermore, in Japanese Patent Laid-Open No. 2008-171041, a means for confirming the authenticity of software of an expansion unit connected to the multifunction peripheral when the expansion unit is started, and starting the expansion unit after the authenticity is confirmed has been proposed. If the authenticity confirmation fails, the use of the expansion unit is stopped and control is performed so that the fraudulent software does not operate.

In Japanese Patent Laid-Open No. 2008-171041, there is a problem in that because the use of an expansion unit is stopped uniformly if software authenticity confirmation fails, the availability of the system suffers since the expansion unit cannot be used.

SUMMARY OF THE INVENTION

The present invention ensures the availability of the system while allowing the device to be used securely.

The present invention has the following configuration.

According to an aspect of the present invention, an information processing apparatus comprising: a verification unit configured to verify an application program; and a control unit configured to, in a case where the verification by the verification unit fails, determine whether or not to restore the application program based on a type of the application program, restore the application program in a case where the control unit determined that the application program is to be restored, not permit execution of the application program in a case where the control unit determined that the application program is not to be restored, and permit execution of an application program successfully verified by the verification unit or the restored application program is provided.

By virtue of the present invention, the availability of the system is ensured while allowing a user to use the device securely.

Further features of the present invention will become apparent from the following description of exemplary embodiments with reference to the attached drawings.

BRIEF DESCRIPTION OF THE DRAWINGS

FIG. 4 is a diagram illustrating an example of a startup verification correct answer value list.

FIG. 5 is a configuration diagram of an application.

FIG. 6A and FIG. 6B are diagrams illustrating examples of an application management file and a correct answer value list.

FIG. 7A and FIG. 7B are flowcharts for execution of MFP-side processes of the present invention.

DESCRIPTION OF THE EMBODIMENTS

Embodiment 1

Embodiments of the present invention will be explained below with reference to the drawings. In the present embodiment, software verification processing at the time of software startup will be described. In this embodiment, an MFP (Multi-Function Peripheral) is described as an example, but the present invention is a technology that is applicable to information processing apparatuses other than MFPs.

Figure 1:
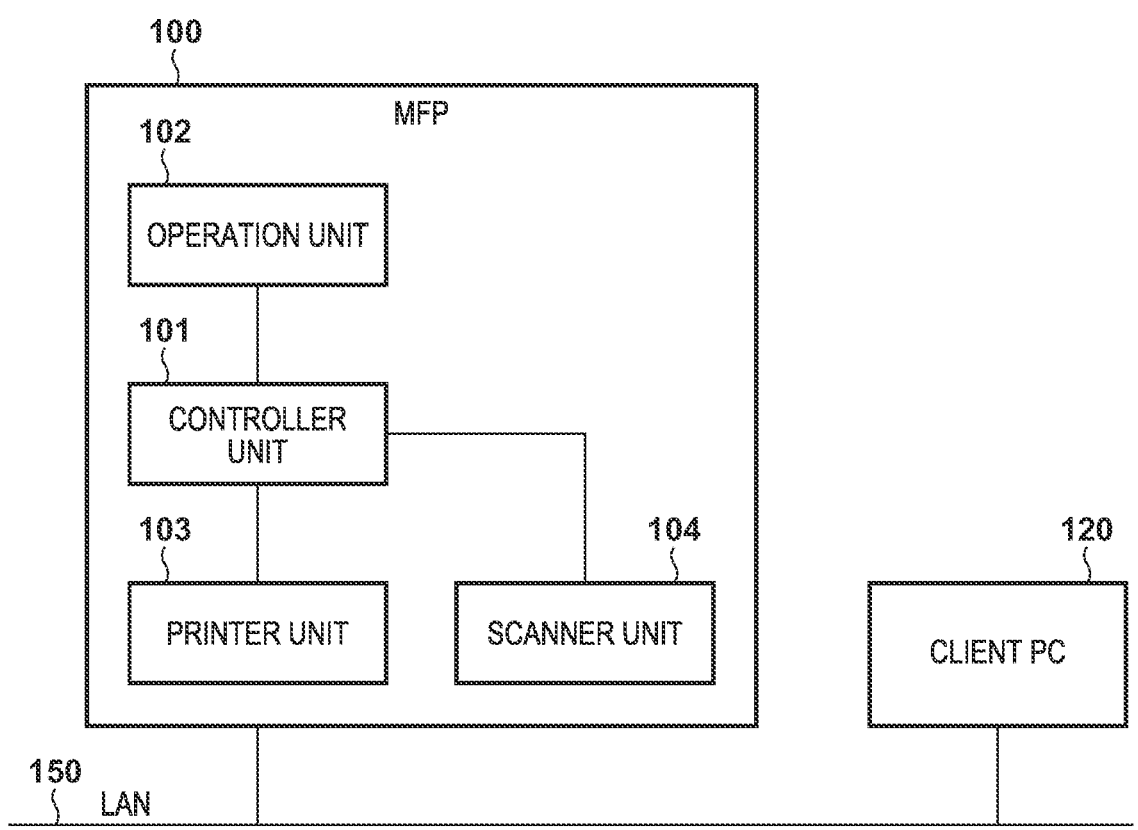
FIG. 1 is a block configuration diagram illustrating a connection configuration between an MFP and a client PC according to the present invention.

FIG. 1 is a block diagram illustrating a connection configuration between an MFP and a client PC according to the present invention. An MFP 100 and a client PC 120 are connected via a LAN 150. The MFP 100 has an operation unit 102 for user input and for output to the user. The operation unit 102 provides a user interface. The MFP 100 includes a printer unit 103 for outputting electronic data as images on a paper medium. The MFP 100 has a scanner unit 104 for reading a paper medium and performing a conversion into electronic data. The operation unit 102, the printer unit 103, and the scanner unit 104 are connected to a controller unit 101, and realize functions as a multifunction peripheral under the control of the controller unit 101. The client PC 120 performs processing of transmitting a print job to the MFP 100.

Configuration of Controller Unit

Figure 2:
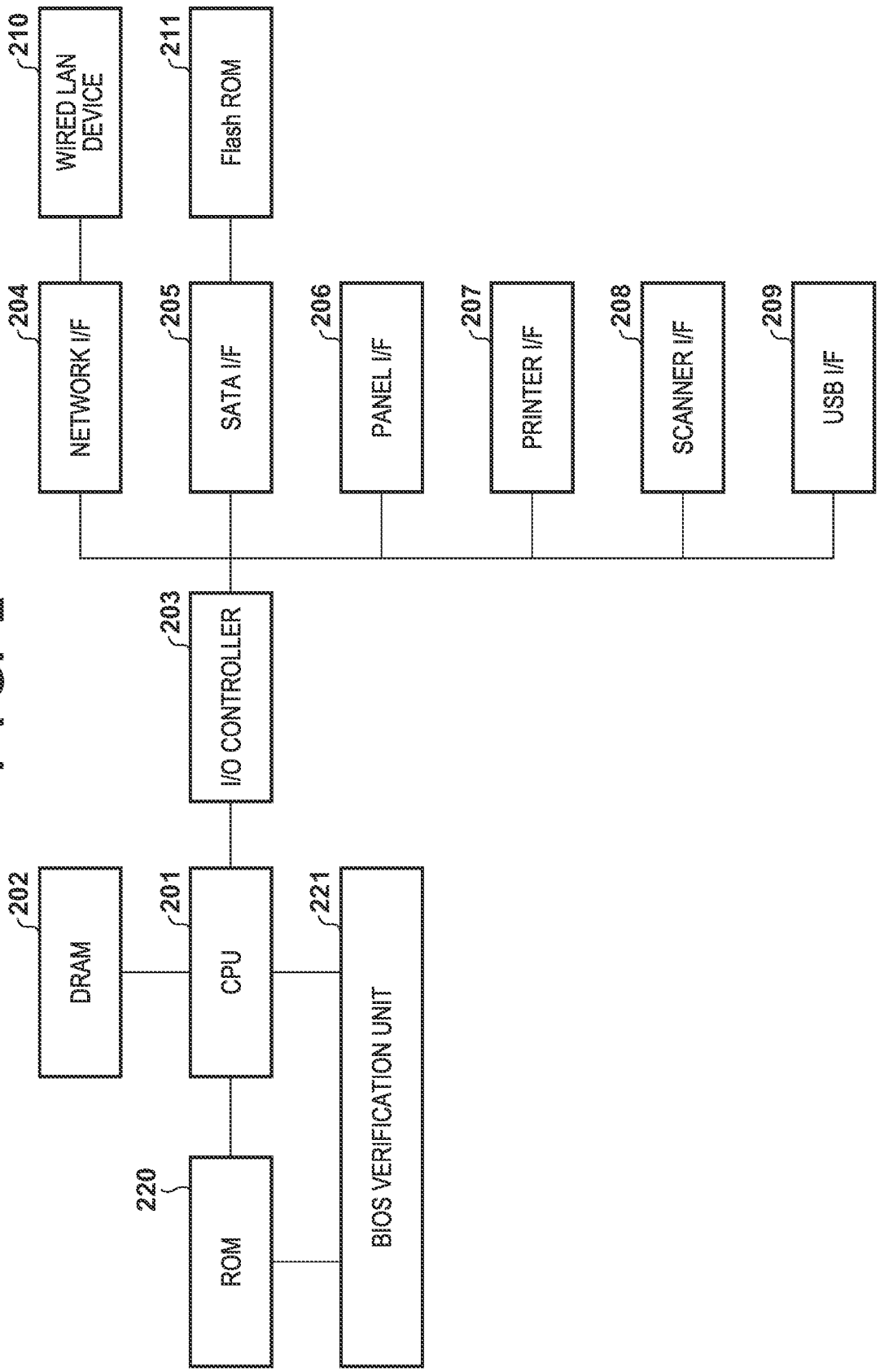
FIG. 2 is an internal configuration diagram of a controller unit of the MFP.

FIG. 2 is a block diagram illustrating details of the controller unit 101 of the MFP 100. A CPU 201 is a processor that performs main calculation process within the controller. The CPU 201 is connected to a DRAM 202 via a bus. The DRAM 202 is used by the CPU 201 as a working memory for temporarily arranging program data representing calculation instructions and data to be processed over the course of calculation by the CPU 201. The CPU 201 is connected to an I/O controller 203 via a bus. The I/O controller 203 inputs and outputs in relation to various devices in accordance with instructions from the CPU 201. An SATA (Serial Advanced Technology Attachment) I/F 205 is connected to the I/O controller 203, and a Flash (registered trademark) ROM 211 is connected to the SATA I/F. The CPU 201 uses the Flash ROM 211 to permanently store programs for implementing functions of the MFP and document files. The programs stored in the Flash ROM 211 include additionally installed application programs (applications). A network I/F 204 is connected to the I/O controller 203. A wired LAN device 210 is connected to the network I/F 204.

The CPU 201 controls the wired LAN device 210 via the network I/F 204, thereby realizing communication over the LAN 150. A panel I/F 206 is connected to the I/O controller 203, and the CPU 201 realizes user input/output in relation to the operation unit 102 via the panel I/F 206. A printer I/F 207 is connected to the I/O controller 203, and the CPU 201 realizes paper media output processing using the printer unit 103 via the printer I/F 207. A scanner I/F 208 is connected to the I/O controller 203, and the CPU 201 realizes original document read processing using the scanner unit 104 via the scanner I/F 208. The I/O controller 203 is connected to a USB I/F 209 to control any device connected to the USB I/F. A ROM 220 is connected to the CPU 201 by a bus, and a control program for implementing a BIOS (Basic Input Output System) is stored therein.

A BIOS verification unit 221 is connected to the ROM 220 and the CPU 201 by a bus, and verifies BIOS data stored in the ROM 220 and instructs the CPU to start the BIOS. Here, the BIOS verification unit 221 is hardware, and the BIOS verification is performed by hardware. So that a bus connecting the BIOS verification unit 221 and the CPU 201 is not manipulated by a malicious third party, a form is taken such that these are realized on the same chip or by a configuration equivalent thereto wherein it is physically impossible to confirm what is on the bus from the outside. In the present embodiment, a configuration in which a control mechanism of the BIOS verification unit 221 is implemented in hardware as an integrated circuit is assumed, but configuration may be taken in which elements such as a dedicated CPU and ROM storing control software are mounted on the same chip and cannot be changed after manufacturing. Although the BIOS verification unit 221 is connected to the CPU 201 by a bus, it may be connected via the I/O controller 203.

When a copy function is implemented, the CPU 201 reads a program and data for the copy function from the Flash ROM 211 via the SATA I/F 205 to the DRAM 202. The CPU 201 executes the program loaded into the DRAM 202, and detects a copy instruction from a user in relation to the operation unit 102 via the panel I/F 206. When the CPU 201 detects the copy instruction, it receives an original from the scanner unit 104 via the scanner I/F 208 as electronic data and stores the electronic data in the DRAM 202. The CPU 201 performs a color-conversion process or the like suitable for outputting the image data stored in the DRAM 202. The CPU 201 transfers the image data stored in the DRAM 202 to the printer unit 103 via the printer I/F 207, and performs processing for outputting to a paper medium.

When PDL (Page Description Language) printing is performed, the client PC 120 issues a print instruction via the LAN 150. The CPU 201 reads a PDL-printing program and data from the Flash 211 to the DRAM 202 via the SATA I/F 205, executes the PDL-printing program read into the DRAM 202, and detects a printing instruction via the network I/F 204. Upon detecting the PDL-transmission instruction, the CPU 201 receives print data via the network I/F 204, and stores the print data in the Flash ROM 211 via the SATA I/F 205. When the storage of the print data is completed, the CPU 201 deploys the print data stored in the Flash ROM 211 as image data on the DRAM 202. The CPU 201 performs a color-conversion process or the like suitable for outputting the image data stored in the DRAM 202. The CPU 201 transfers the image data stored in the DRAM 202 to the printer unit 103 via the printer I/F 207, and performs processing for outputting to a paper medium.

Software Configuration

Figure 3:
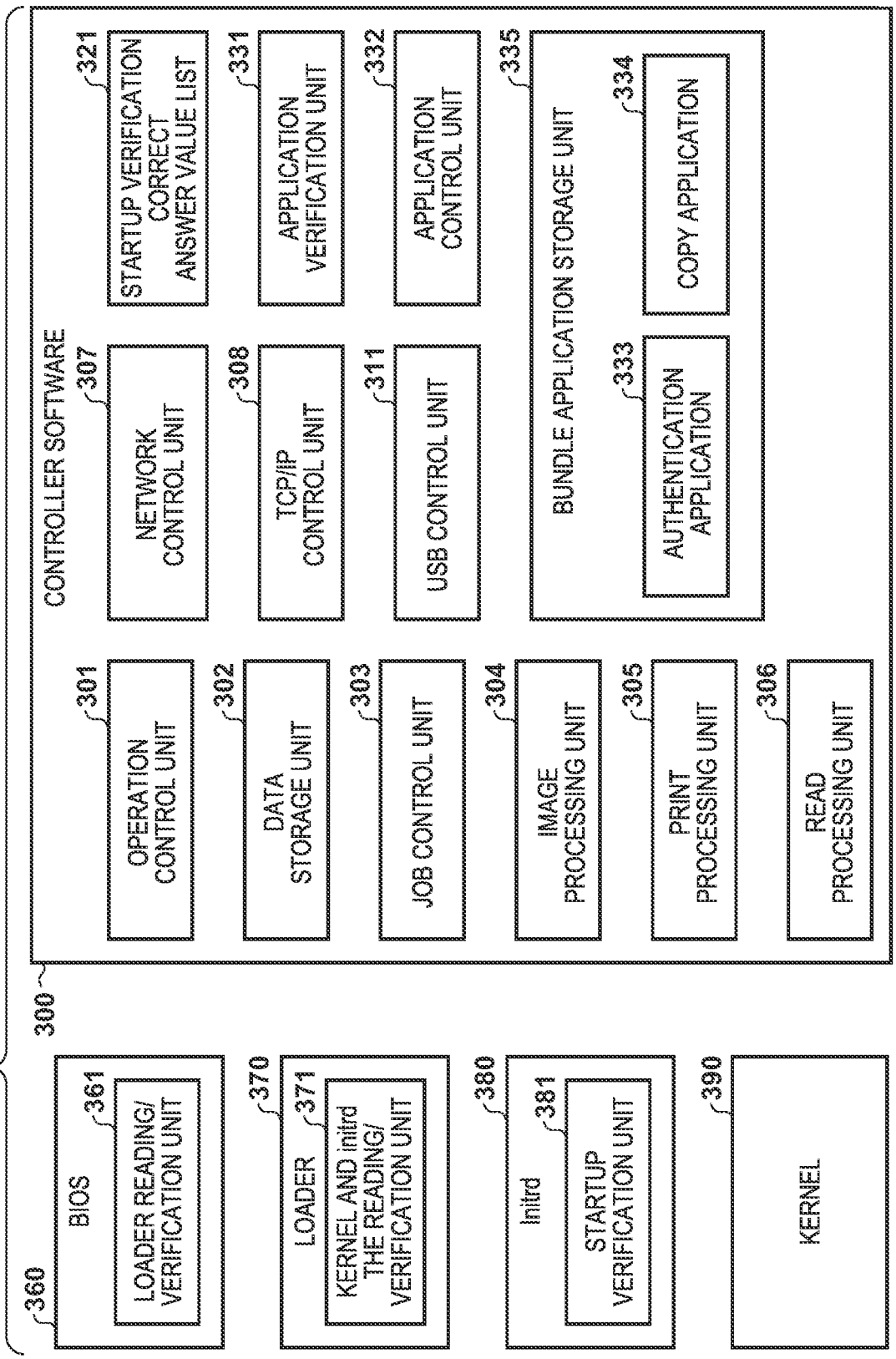
FIG. 3 is a block configuration diagram of software executed in the controller of the MFP.

FIG. 3 is a block diagram illustrating the structure of software executed by the controller unit 101 of the MFP. All of the software executed by the controller unit 101 is executed by the CPU 201. The CPU 201 executes a BIOS 360 stored in the ROM 220. The CPU 201 executes a loader 370, an Initrd 380, and controller software 300 stored in the Flash ROM 211 after loading them into the DRAM 202. The BIOS 360 executes basic processes for the CPU 201 to control the I/O controller 203 and the DRAM 202.

The BIOS 360 internally includes control software as a BIOS and signature data corresponding to the control software. A loader reading/verification unit 361 is included in the control software of the BIOS 360, and includes process code for verifying the loader and a public key corresponding to a signature given to the loader. The BIOS 360 further includes a process of reading and starting the loader 370 from the Flash ROM 211. The loader 370 executes a process of reading, from the Flash ROM 211, and starting a kernel 390 and the Initrd 380. The loader 370 internally includes control software as a loader and signature data corresponding to the control software.

A kernel and Initrd loader reading/verification unit 371 is included in the loader 370, and includes a process for verifying the kernel and the Initrd, and public keys for signatures given to the kernel and the Initrd. The Initrd 380 executes a process of reading, from the Flash ROM 211, and starting controller software 300. The Initrd 380 internally includes control software as an Initrd and signature data corresponding to the control software. The startup verification unit 381 is included in the Initrd 380, and includes a process for verifying all the program files constituting the controller software 300 at startup, and a public key for the provided signatures. Here, a secret key for all the signature data is used only at the time of development of the software, and is not generally distributed.

An operation control unit 301 displays a screen image to a user on the operation unit 102, detects a user operation, and executes processing linked to a screen component such as a button displayed on the screen when it is operated. A data storage unit 302 stores/reads data to/from the Flash ROM 211 in response to requests from other control units. For example, when the user wants to change some device setting, the operation control unit 301 detects the content inputted by the user to the operation unit 102, and the data storage unit 302 stores the data as a setting value in the Flash ROM 211 in response to a request from the operation control unit 301. In accordance with a setting value stored in the data storage unit 302, a network control unit 307 makes a network setting such as that for an IP address to a TCP/IP control unit 308 at a time of system startup or at a time of detecting a setting change.

The TCP/IP control unit 308 performs a process of transmitting and receiving network packets via the network I/F 204 in accordance with an instruction from other control. A job control unit 303 controls job execution in accordance with an instruction from another control unit. An image processing unit 304 processes image data into a format suitable for a respective application in accordance with an instruction from the job control unit 303. A print processing unit 305 outputs by printing an image onto a paper medium via a printer I/F 207 in accordance with an instruction from the job control unit 303. In accordance with an instruction from the job control unit 303, a reading control unit 306 reads a set original document via the scanner OF 208. A USB control unit 311 controls the USB I/F 209 to control a device connected to by USB. A startup verification correct answer value list 321 is a list of correct answer values used by the startup verification unit 381 in the verification process. FIG. 4 illustrates a sample of a data format of the startup verification correct answer value list 321. The startup verification correct answer value list 321 lists combinations of a file name 3001 and a hash 3002 for all program files included in the controller software 300. The program files includes an OS program, a program for providing functions, or one of these. As the content of the data, at least a file name, a file arrangement location (position in a directory), and a hash value calculated from the file, and information such as the hash value is listed.

An application control unit 332 manages operation states of applications running on the MFP 100 and startup/stoppage of applications. In the present embodiment, the application control unit 332 manages applications that operate using an OSGI (Open Services Gateway Initiative) framework that manages dynamic installation and execution of Java (registered trademark) modules. An application verification unit 331 verifies an application started by the application control unit 332.

A bundle application storage unit 335 stores an application (bundle application) included in the controller software 300 in advance. In the bundle application storage unit 335 of FIG. 3, an authentication application 333 and a copy application 334 are stored. The authentication application 333 is an application for performing a process of authenticating a user who uses the MFP 100. The copy application 334 is an application for displaying a screen for setting or the like to execute copying on the operation unit 102, accepting an instruction from the user, and executing copying. It should be noted that an application that is not included in the controller software 300 can be further added to the MFP 100 by using the operation unit 102. Details of application management will be described later.

For example, when the copy function is executed, the application control unit 332 starts the copy application 334 and instructs the operation control unit 301 to display a copy screen. The operation control unit 301 detects a request to start the copy function, and instructs the job control unit 303 to copy. The job control unit 303 instructs the reading control unit 306 to read an original, to thereby acquire a scanned image. The job control unit 303 instructs the image processing unit 304 to convert the scanned image into a format suitable for printing. The job control unit 303 instructs the print processing unit 305 to print, and thereby outputs the copy result. Although the functions to be executed and user interfaces corresponding to the functions differ, applications are executed by a similar procedure to this for other functions as well.

Processing by the Application Control Unit

The processing of the application control unit 332 will be described in detail with reference to FIG. 5. FIG. 5 is a diagram illustrating an exemplary configuration of directories associated with applications in a Flash ROM 211.

The Flash ROM 211 includes a bundle directory 510 and a cache directory 520. The bundle directory 510 stores bundle applications of FIG. 3 (for example, the authentication application 333 and the copy application 334). The bundle applications are stored in the bundle directory 510 when the controller software 300 is installed or updated in the MFP 100. The cache directory 520 stores installed applications 521 to 524, data used by the applications, a management file 525 for managing the startup order and states of the installed applications, and a correct answer value list 526 for application verification. The installed applications include, in addition to the bundle applications, applications not included in the controller software 300 and later installed using the operation unit 102 of the MFP 100. In FIG. 5, a card authentication application 523 and a transmission application 524 are later-installed applications. That is, for the bundle applications, the original program file is stored in the bundle directory 510, and that is deployed and stored in the cache directory 520 in an executable format, for example. Therefore, even if a program or data in the cache directory 520 is impaired, it can be restored by re-installing the program or data from the bundle directory 510 to the cache directory 520.

FIG. 6A illustrates a sample of a data format of the management file 525, and FIG. 6B illustrates a sample of a data format of the application correct answer value list for verification 526.

Figure 12:
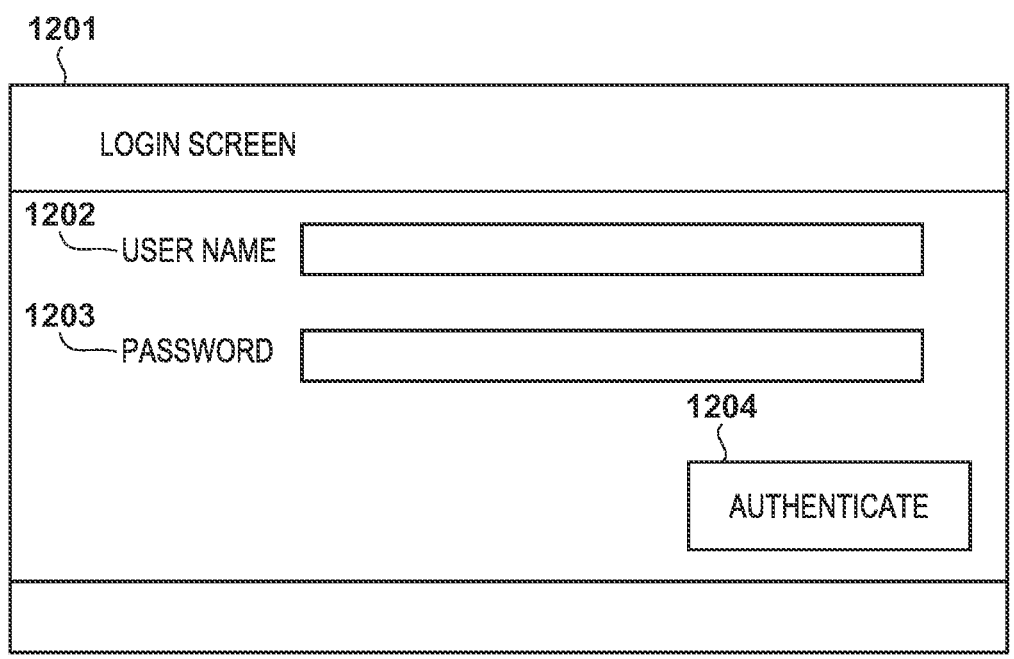
FIG. 12 is a screen configuration diagram related to a setting.

The management file 525 of FIG. 6A lists combinations of an application name 6001, a bundle directory path 6002, an application type 6003, an application state 6004, and a startup order 6005 for all applications included in the cache directory 520. In FIG. 6A, the authentication application 521 corresponds to login_app, the copy application 522 corresponds to copy_app, the card authentication application 523 corresponds to card_app, and the transmission application 524 corresponds to send_app. The application type 6003 indicates whether or not the application is a bundle application and an application type. The application type is information indicating whether the application is a login application or a copy application. The login application is an application that performs a process of authenticating a user using the MFP, and displays an authentication input screen as illustrated in FIG. 12 on the operation unit 102, for example, and performs user authentication on the inputted authentication information. By performing user authentication, unauthorized use of the MFP can be prevented, and menu screens customized for each user can be displayed. In FIG. 5, an authentication application 521 and a card authentication application 523 are classified as login applications.

The application correct answer value list for verification 526 in FIG. 6B lists combinations of an application name 6101 and a hash 6102 for all applications included in the cache directory 520. Note that, the application correct answer value list for verification 526 may be encrypted and a signature may be attached and stored in the Flash ROM 211 such that it is not tampered with illicitly.

When an application is added by installation in the MFP 100, the application control unit 332 stores the application in the cache directory 520 and generates a directory for storing data used by the application. Further, application information such as a relationship between the application and data, the application type, and the like are stored in the management file 525. When an application of the bundle directory 510 is added in conjunction with installation of the controller software 300, the application control unit 332 stores the application in the cache directory 520 and generates a directory for storing data used by the application. When an application in the bundle directory 510 is updated, the application in the cache directory 520 is updated using the application in the bundle directory 510. For example, when the authentication application 333 of the bundle directory 510 is updated in conjunction with updating of the controller software 300, the authentication application 333 is used to update the authentication application 521 in the cache directory 520.

When adding or updating an application in the cache directory 520, the application control unit 332 requests the application verification unit 331 to update the correct answer value list 526 for application verification. The application verification unit 331 calculates hash values for applications stored in the cache directory 520 based on the instruction from the application control unit 332, and updates the application correct answer value list 526. The application control unit 332 reads the management file 525 at the time of MFP 100 startup and starts the applications in the cache directory 510 in turn according to the startup order. When a change occurs in the management information due to a change in the state of the application or the like, the application control unit 332 updates the management file 525 in accordance therewith.

Software Verification Process

A processing flow for verifying the software when the software is started by the MFP 100 will be described with reference to FIG. 7A and FIG. 7B. This process is performed once each time the MFP 100 is started up. Here, the process executed by the MFP 100 of FIG. 7A is executed by the BIOS verification unit 221. In the following explanation, the verification process of FIG. 7A will be referred to as hardware verification. The processing executed by the MFP 100 of FIG. 7B is executed as arithmetic processing of the CPU 201 after the CPU 201 reads the program stored in the Flash ROM 211 into the DRAM 202. In the following explanation, the verification process of FIG. 7B will be referred to as a software verification. Note that even if each verification process is a verification process performed by the same MFP 100, the verification agent differs, and hardware verification is not a process for verifying software executed by the CPU 201.

When power is supplied and the startup process is started, the BIOS verification unit 221 is started, and the BIOS verification processing is started as step S1001. In step S1002, the MFP 100 performs a BIOS 360 verification process and verifies whether it was successful. If it succeeds, step S1003 is executed, and if it fails, step S1005 is executed. As a verification process, signature verification is performed on the signature of the BIOS 360 read from the ROM 220 by the BIOS verification unit 221 using the public key arranged in the BIOS verification unit 221. The verification at the time of startup of the present embodiment is signature verification in consideration of the startup order, and in the signature verification, security is ensured by performing signature verification of the agent to be started next. In the present example, only the first stage of BIOS verification is performed by dedicated hardware, and the subsequent verifications are performed by software, and so verification software is regarded as a single object, and thus treated as the verification processing agent. The verification agent of the stage after the BIOS verification is the loader reading/verification unit 361 included in the BIOS 360 in the present example.

In step S1003, the MFP 100 starts the BIOS 360 by instructing the CPU 201. In step S1005, the MFP 100 does not start the BIOS and stops the system by aborting the startup sequence at this step. Here, since the BIOS verification unit 221 does not have a device related to user notification, the notification is not performed, but the notification may be performed by connecting an LED (Light Emitting Diode) and causing the LED to emit light. In step S1004, the MFP 100 ends the BIOS 360 verification process. Hardware verification is a verification method implemented by hardware, and since it is necessary to tamper with an integrated circuit to tamper with such a verification process, this is an extremely robust verification method.

When the BIOS 360 is started, a process of verifying the software located in the Flash ROM 211 is started as step S1011. That is, triggered by a successful verification, an already-verified agent performs verification of software which will serve as the verification agent for the next stage.

In step S1012, the MFP 100 uses the loader reading/verification unit 361 to perform a process of verifying the loader 370, and confirms whether or not it has succeeded. If it succeeds, step S1013 is executed, and if it fails, step S1022 is executed. As a verification process, signature verification is performed on the signature of the loader 370, which is the next startup target, read from the Flash ROM 211, using the public key held by the loader reading/verification unit 361.

In step S1013, the MFP 100 starts up the loader. In step S1014, the MFP 100 uses the kernel and Initrd reading/verification unit 371 to perform a process of verifying the kernel 390, and confirms whether or not it has succeeded. If it succeeds, step S1015 is executed, and if it fails, step S1022 is executed. As a verification process, signature verification is performed on the signature of the kernel 390, which is the next startup target, read from the Flash ROM 211, using the public key corresponding to the signature of the kernel 390 which is held by the Initrd reading/verification unit 371. In step S1015, the MFP 100 starts up the kernel.

In step S1016, the MFP 100 uses the kernel and Initrd reading/verification unit 371 to perform a process of verifying the Initrd 380, and confirms whether or not it has succeeded. If it succeeds, step S1017 is executed, and if it fails, step S1022 is executed. As a verification process, signature verification is performed on the signature of the Initrd 380, which is the next startup target, read from the Flash ROM 211, using the public key corresponding to the signature of the Initrd 380 which is held by the Initrd reading/verification unit 371. In step S1017, the MFP 100 starts up the Initrd 380.

In step S1018, the MFP 100 uses the startup verification unit 381 to perform verification of the controller software 300, and confirms whether or not it has succeeded. If it succeeds, step S1019 is executed, and if it fails, step S1022 is executed. As the verification process, hash values of all the program files included in the controller software 300, which are described in the startup verification correct answer value list 321, which is the next startup target, read from the Flash ROM 211, are acquired. Then, processing that, for each file, compares them with hash values for all the program files that have been recalculated by reading the Flash ROM 211 is performed. In step S1019, the MFP 100 starts up the controller software 300. Since the controller software 300 is divided into a plurality of program files, program files necessary for starting the system are sequentially started. In step S1020, the MFP uses the application control unit 332 to execute an application startup process. Details of the application startup process will be described later. In step S1022, the MFP 100 notifies the user that tampering has been detected by displaying an error screen on the operation unit 102. In step S1023, the MFP 100 stops the system by aborting the startup sequence at this step. In step S1021, the MFP 100 ends the process for verifying the software located in the Flash ROM 211.

In general, software verification is performed by a verification method implemented by a program that is software, and thus may be tampered with by the rewriting of the software in the storage unit. As in the above flow, it is possible to ensure that the software to be verified has not been tampered with by verifying the software by another component beforehand. Each program among the programs performs software verification in order, but it can be guaranteed that there has been no tampering for the entire system based upon the previous software verification.

Application Startup Processing

Figure 8A:
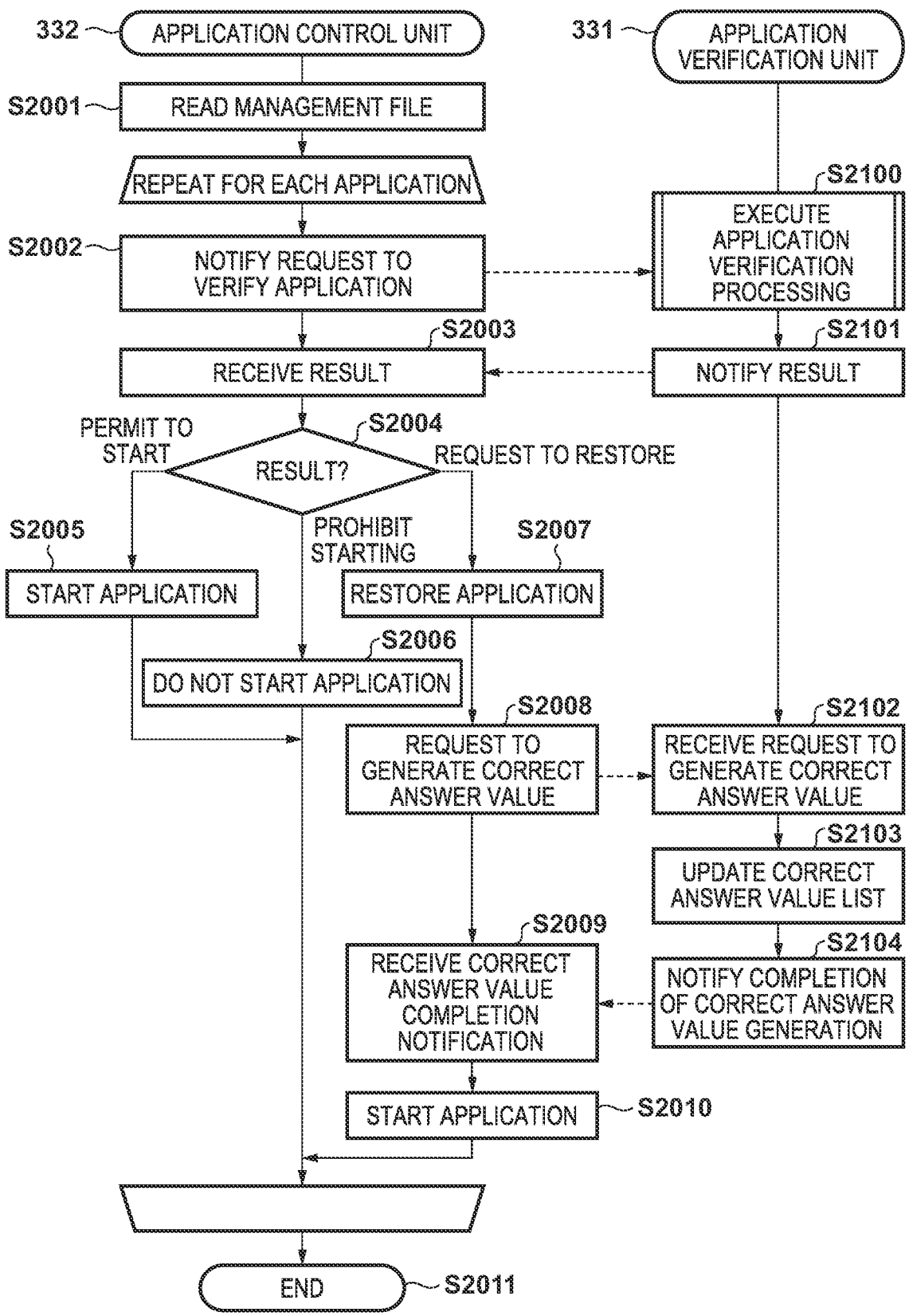
FIG. 8A is a flowchart for execution of an MFP-side process of the present invention.
Figure 8B:
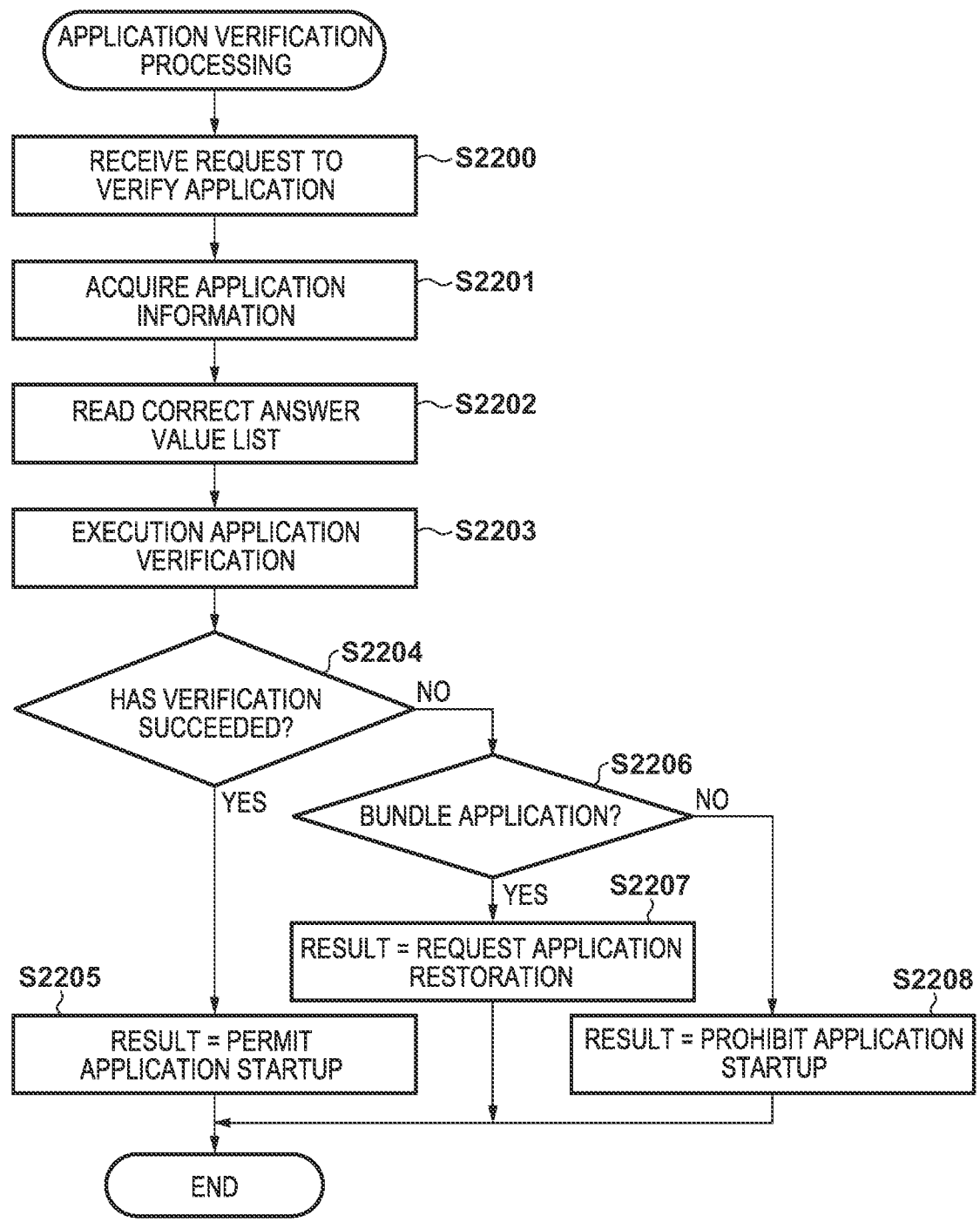
FIG. 8B is a flowchart for execution of an MFP-side process of the present invention.

A processing flow in which the MFP 100 starts an application by the application control unit 332 will be described with reference to FIG. 8A and FIG. 8B. The processing executed by the MFP 100 of FIG. 8 is executed as CPU 201 arithmetic processing after the CPU 201 reads the program stored in the Flash ROM 211 into the DRAM 202.

The MFP 100 uses the application control unit 332 to determine an application to be started by reading the management file 525 from the cache directory 520 of the Flash ROM 211 in step S2001. The application control unit 332 requests the application verification unit 331 to verify the application prior to starting the application (step S2002). Here, the application control unit 332 includes the name of the application to be started up and the application type in the application verification request. The application name and the application type indicate information of an application name 6001 and an application type 6003 included in the management file 525 of FIG. 6A, respectively. When the application verification unit 331 receives a request to verify an application, the application verification unit 331 executes a verification process in step S2100. Details thereof will be described later by referring to FIG. 8B.

When the application verification is completed, the application verification unit 331 notifies the result (step S2101), and the application control unit 332 receives the result information from the application verification unit 331 in step S2003. The application control unit 332 confirms the received result information (step S2004). When it is determined that the result information is "permit application startup", the application control unit 332 executes a process for starting up the application (step S2005). When it is determined that the result information is "prohibit application startup", the application control unit 332 does not execute the process for starting up the application, but updates the state of the management file to be stopped application (step S2006). When it is determined that the result information is "request application restoration", the application control unit 332 executes a process for restoring the application (step S2007).

As the application restoration process, the application control unit 332 first deletes the application in the cache directory 520, then deploys the application included in the bundle directory 510 to the cache directory 520, and thereby restores the application. That is, the application can be re-installed in the cache directory 520 by using the program file included in the bundle directory 510. For example, when the verification result of the copy application 522 in FIG. 5 is "application restoration request", the application control unit 332 deletes the copy application 522 in the cache directory 520, acquires the copy application 334 in the bundle directory 510 with reference to the management file 525, and restores the copy application 522 by deploying it in the region of the copy application in the cache directory 520. Then, the application control unit 332 requests the application verification unit 331 to update the correct answer value list 526 for application verification (step S2008). When the application verification unit 331 receives this (step S2102), it calculates the hash value using the updated application of the cache directory 520 and updates the application correct answer value list 526 (step S2103). Then, the application control unit 332 is notified of the completion of updating of the correct answer value list 526 (step S2104). The application control unit 332 starts the application of the cache directory 520 (step S2010) upon receiving the notification of completion of the updating of the correct answer value list (step S2009). The application control unit 332 refers to the management file 525, and repeats the startup process of the application to be started up next from step S2002. Note that in FIG. 8A, a trapezoidal block indicates that the blocks sandwiched therebetween are repeated according to a condition. Here, the condition is to target all applications in the cache directory 520.

Here, an application in the bundle directory 510 is verified in step S1018 as a part of the controller software 300 by the startup verification unit 381, and it is guaranteed to not have been tampered with. Therefore, when an application is restored using an application of the bundle directory 510 in step S2007, verification of the application of the bundle directory 510 is not performed. Also, the restored application in the cache directory 520 is not verified, and the application is started as is.

Next, the application verifying process of FIG. 8B will be described. When the application verification unit 331 receives an application verification request (step S2200), it acquires the name of the application to be verified and the application type information (step S2201). Then, in step S2202, the application verification unit 331 reads the application correct answer value list for verification 526 from the cache directory 520 of the Flash ROM 211. Next, in step S2203, the application verification unit 331 performs processing for verifying the application, and confirms whether or not the verification has succeeded. In the application verifying process, the data of the application stored in the Flash ROM 211 cache directory 520 is read to calculate a hash value, and the hash value is compared with the hash value of the application described in the correct answer value list 526. When the compared values match each other and the application is successfully verified, "permit application startup" is set as the result information (step S2205). When the verification of the application has not succeeded, in step S2206, the application verification unit 331 checks the type of the application acquired by step S2201, and determines whether or not the application is a bundle application. When it is determined that it is not a bundle application, "prohibit application startup" is set as the result information (step S2208). When it is determined that it is a bundle application, "request application restoration" is set as the result information (step S2207). In step S2101, the application verification unit 331 notifies the application control unit 332 of the result information.

As described above, the information processing apparatus of the present embodiment includes a plurality of stages of loaders in which a loader included in a BIOS is set as a first stage, an Initrd for loading an application program is set as a final stage, and together with loading a program to be loaded, the loader of the next stage is loaded by the loader of the preceding stage. Thereby, the BIOS which includes a loader is verified by tamper-proof hardware or the like, a program is read by a verified loader, and the program and loader of the next stage are verified. This iteration verifies the authenticity of the loaded program.

As described above, according to the first embodiment, in a system for confirming the authenticity of an application, when the verification of the authenticity fails, it is determined whether or not restoration is possible according to an application type, and in a case where it is determined that restoration is possible (that is, it can be said that re-installation is possible), the application is automatically restored and started, so that the user can securely use the device while ensuring the availability of the system.

Embodiment 2

The second embodiment of the present invention will be explained below with reference to the drawings. In the present embodiment, a method of controlling a method of notifying the user in accordance with the type of the application when application verification fails will be described.

Figure 9:
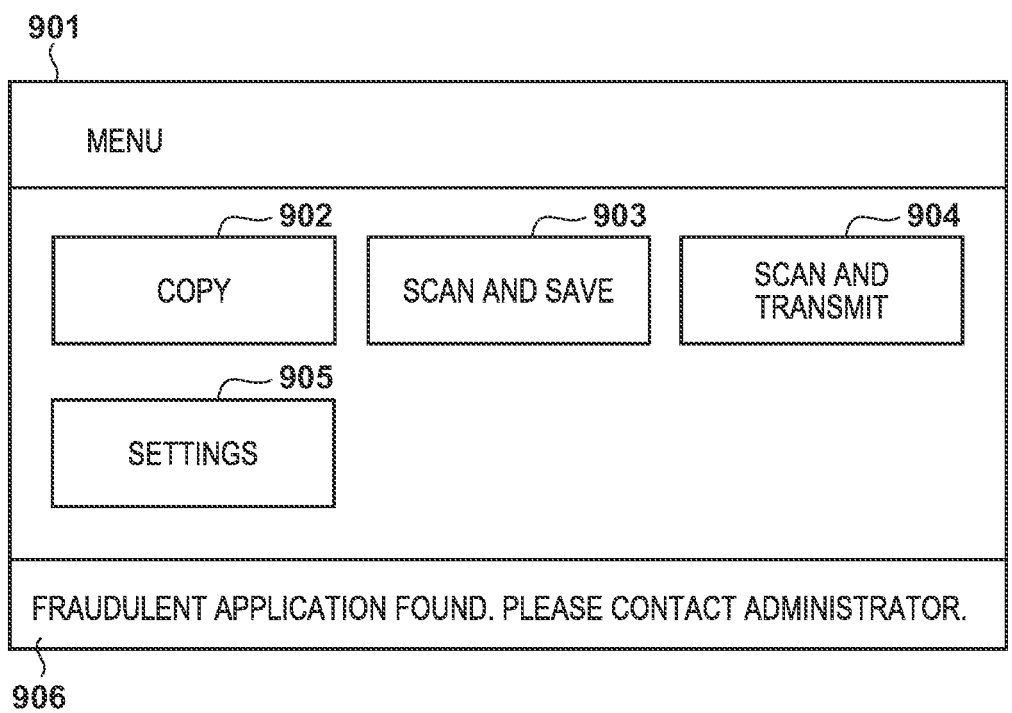
FIG. 9 is a screen configuration diagram related to a setting.

FIG. 9 illustrates a menu screen 901 displayed on the operation unit 102, which is used by the user to instruct execution of various functions of the multifunction peripheral. Button 902 is used by the user to indicate a copy function. Button 903 is used by the user to indicate a scan and save function. Button 904 is used by the user to indicate a scan and send function. Button 905 is used by the user to indicate change of a device setting. There is also a message display area 906 at the bottom of the screen that can display various messages to the user for occurrences during operation of the device. In FIG. 9, the user is notified that there is an application for which verification has failed. This message at the same time also indicates that the use of the application program that failed to be verified is not permitted.

Figure 10:
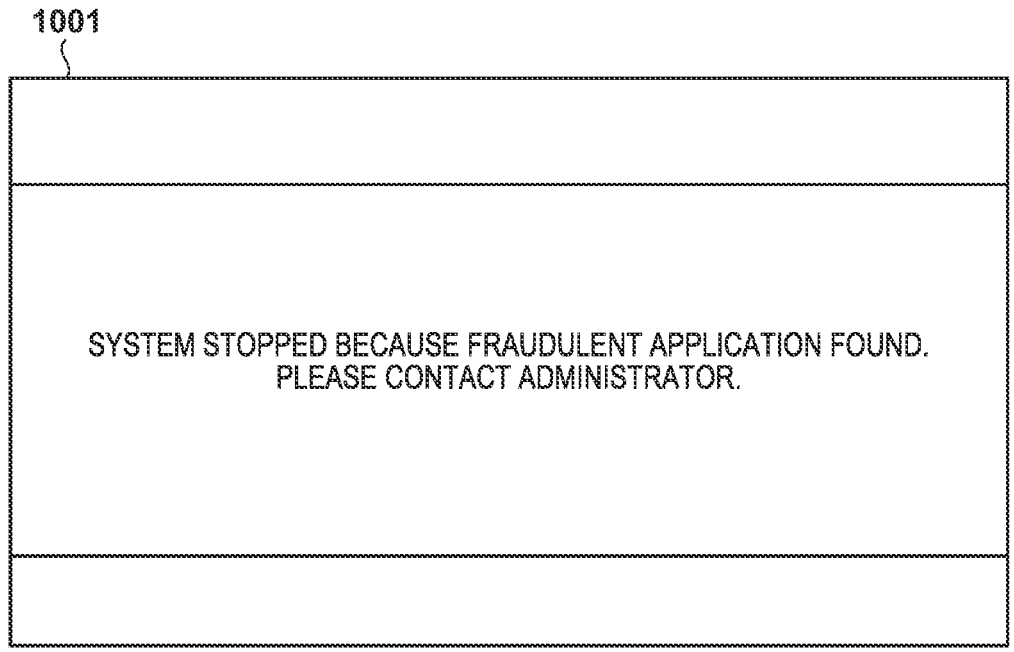
FIG. 10 is a screen configuration diagram related to a setting.

FIG. 10 illustrates an error screen 1001 displayed on the operation unit 102. In FIG. 10, since there is an application for which verification has failed, it is notified that the system has been stopped. Further, the screen cannot be changed to a normal function execution screen, and so the user will not be able to use the MFP 100 thereafter.

Figure 11:
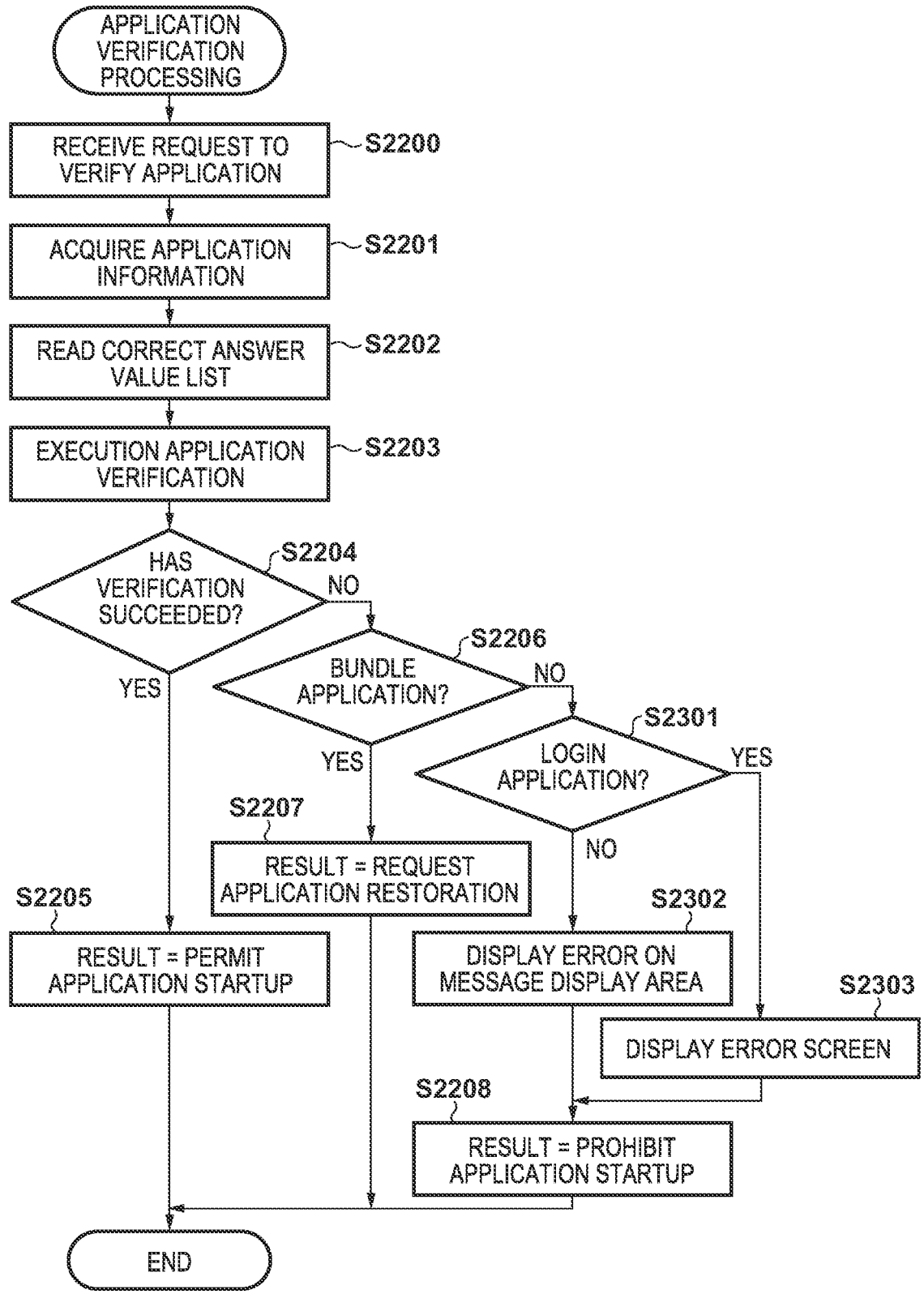
FIG. 11 is a flowchart for execution of an MFP-side process of the present invention.

FIG. 11 illustrates application verification processing in the present embodiment. This illustrates procedures executed in place of FIG. 8B of the first embodiment. The difference from FIG. 8B is steps S2301-S2303 which are executed when it is determined that the application is a bundle application, and other components and processes are the same as those of the first embodiment. Although FIG. 11 will be described below, the steps that are the same as those of FIG. 8B are omitted.

When the verification of the application fails in step S2204, the application verification unit 331 checks the application type. In step S2206, a check is performed to determine whether the application type acquired in step S2201 is bundle application. When it is determined that the application is not a bundle application, the application verification unit 331 further determines whether or not the application type is login application in step S2301. In step S2301, when the application verification unit 331 determines that the application type is login application, an error screen 1001 as illustrated in FIG. 10 is displayed and the entire system of the MFP 100 is stopped (step S2303). The entire system stoppage means that the MFP 100 is started up but the user cannot use functions of the MFP 100. Since the MFP 100 displays the error screen of FIG. 10 on the operation unit 102 and prohibits the user from shifting to a normal function execution screen, functions of the MFP 100 such as the copy function are restricted to be unavailable. The MFP 100 also restricts functions of the MFP 100 via the network I/F 204 to be unavailable in conjunction with display of the error screen of FIG. 10. For example, even if a PDL printing instruction is received via the network I/F 204 while the error screen of FIG. 10 is being displayed, the MFP 100 does not execute the printing and ends the printing with an error. In step S2302, in a case where the application verification unit 331 determines that the application type is not a login application, an error message 906 is displayed in the message region of the menu screen as illustrated in FIG. 9. Thereby, the user can continue to use the MFP 100 with the exception of the fraudulent application.

Since the user would become able to use the MFP without being authenticated when the startup of the login application is stopped, security of the MFP would suffer. For this reason, by displaying an error screen in step S2303 and making the MFP 100 unavailable, it is possible to prevent login applications from being tampered with and the MFP 100 being used illicitly.

As described above, according to the second embodiment, in a system for confirming the authenticity of an application, when the verification of the authenticity fails, by stopping the system in accordance with the application type, it is possible to prevent the device from being used illicitly upon verification failure, and the user can securely use the device while ensuring the availability of the system.

In the embodiments described above, the BIOS verification unit 221 is implemented by hardware, but the BIOS verification unit 221 may be implemented by using programs fixedly stored in a non-rewritable ROM, for example, such that the content of the ROM cannot be changed (or cannot be tampered with).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-159476, filed Aug. 28, 2018 which is hereby incorporated by reference herein in its entirety.

What is claimed is:

1. An information processing apparatus comprising: a verification unit configured to verify an application program;

and a control unit configured to permit execution of the application program in a case where the verifying of the application program is successful, in a case where the verification by the verification unit fails, determine whether the application program is stored in control software, recover the application program by restoring the application program stored in the control software in a case where the control unit determined that the application program is stored in the control software, permit execution of the application program that has been recovered; and not permit execution of the application program in a case where the control unit determined that the application program is not stored in the control software.

2. The information processing apparatus according to claim 1, wherein
the verification unit calculates a hash value of the application program, and
the control unit determines that the verification is successful in a case where the calculated hash value matches a previously stored hash value.

3. The information processing apparatus according to claim 2, wherein in a case where the application program is recovered by restoring the application program stored in the control software, the control unit re-installs the application program, calculates a hash value of the re-installed application program, and updates the previously stored hash value with the calculated hash value calculated for the re-installed application program.

4. The information processing apparatus according to claim 1, further comprising;
a plurality of stages of loader units configured to load a program to be loaded, with a loader included in a basic input/output system as a first stage, and a loader for loading the application program as a final stage, wherein a loader of a next stage is verified by a loader of a preceding stage; and
a tamper-proof second verification unit configured to verify the basic input/output system, wherein
by the tamper-proof second verification unit, the basic input/output system is verified, and by each of the plurality of stages of loaders, a program and a loader of a next stage are read and verified.

5. The information processing apparatus according to claim 4, wherein
the tamper-proof second verification unit verifies the basic input/output system by hardware.

6. The information processing apparatus according to claim 1, further comprising:
a user interface unit, wherein
in a case where execution of the application program is not permitted by the control unit, it is indicated by the user interface unit that the execution of the application program is not permitted.

7. The information processing apparatus according to claim 6, wherein
in a case where the application program whose execution is prohibited is a login application, provision of a function by the information processing apparatus is stopped.

8. The information processing apparatus according to claim 1, further comprising
a printer unit, and
a scanner unit.

9. A method of controlling an information processing apparatus, the method comprising: performing a verification of an application program by a verification unit; permitting execution of the application program in a case where the verifying of the application program is successful; in a case where the verification by the verification unit fails, determining by a control unit whether the application program is stored in control software recovering the application program by restoring the application program stored in the control software in a case where the control unit determined that the application program is stored in the control software; permitting execution of the application program that has been recovered; and not permitting execution of the application program in a case where the control unit determined that the application program is not stored in the control software.

10. A non-transitory non-volatile storage medium having stored thereon a program, the program being for causing a computer to function as: a verification unit configured to verify an application program; and a control unit configured to permit execution of the application program in a case where the verifying of the application program is successful, in a case where the verification by the verification unit fails, determine whether the application program is stored in control software, recover the application program by restoring the application program stored in the control software in a case where the control unit determined that the application program is stored in the control software, permit execution of the application program that has been recovered; and not permit execution of the application program in a case where the control unit determined that the application program is not stored in the control software.

* * * * *